United States Patent [19]

Saito et al.

[11] Patent Number: 4,982,282

[45] Date of Patent: Jan. 1, 1991

[54] IMAGE SIGNAL COMPRESSION ENCODING APPARATUS AND IMAGE SIGNAL EXPANSION REPRODUCING APPARATUS

[75] Inventors: Osamu Saito; Kenji Ito, both of Tokyo, Japan

[73] Assignee: Fuji Photo Film Co. Ltd., Kanagawa, Japan

[21] Appl. No.: 444,282

[22] Filed: Dec. 1, 1989

[30] Foreign Application Priority Data

Dec. 9, 1988 [JP] Japan ............................... 63-309871

[51] Int. Cl.$^5$ ........................................... H04N 7/133
[52] U.S. Cl. ................................. 358/133; 358/261.3; 358/427; 358/909; 375/122; 375/34
[58] Field of Search ...................... 358/133, 261.3, 427, 358/909; 375/122, 34

[56] References Cited

U.S. PATENT DOCUMENTS 4,302,775 11/1981 Widergren ........................... 358/136
4,780,761 10/1988 Daly ..................................... 358/133

Primary Examiner—Howard W. Britton

[57] ABSTRACT

A compression encoder uses an arbitrary normalization coefficient and a preset table to achieve a compression of image signal with a desired compression rate. Since the normalization coefficient and the table data are sent to an image signal decoding and reproducing apparatus together with the compressed image data, the reproducing apparatus can restore the original image from those data items. Furthermore, in the encoder, when an amplitude value of the data exceeds a predetermined value, an overflow sensor means the condition so as to produce normalized data in addition to the Huffman-encoded data. The reproducing apparatus achieves the image signal decoding and reproducing operations by use of the normalized data and the Huffman-encoded data. With these apparatuses, the picture quality can be prevented from being lowered due to an overflow in the encoding operation.

13 Claims, 8 Drawing Sheets

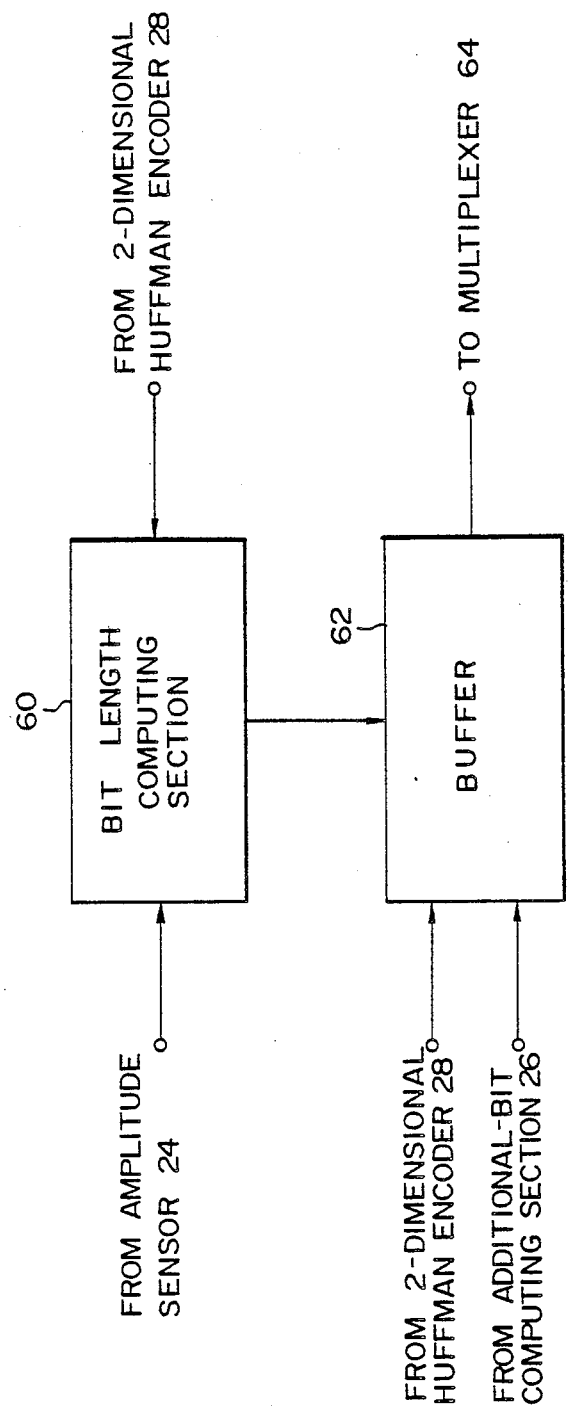
F I G. 6

FIG. 12

| AMPLITUDE VALUE OF TRANSLATION COEFFICIENT | AMPLITUDE RANGE | ADDITIONAL BIT |
|---|---|---|
| -1, 1 | 0 0 1 | 1 |
| -3, -2, 2, 3 | 0 1 0 | 2 |
| -7 ~ -4, 4 ~ 7 | 0 1 1 | 3 |
| -15 ~ -8, 8 ~ 15 | 1 0 0 | 4 |
| -31 ~ -16, 16 ~ 31 | 1 0 1 | 5 |
| -63 ~ -32, 32 ~ 63 | 1 1 0 | 6 |
| -127 ~ -64, 64 ~ 127 | 1 1 1 | 7 |
| -32767 ~ -128, 128 ~ 32767 | 0 0 0 | 16 |

FIG. 13

| OF | SEVEN LOW-ORDER BITS MSB             LSB | AMPLITUDE RANGE |
|---|---|---|
| 0 | 1 X X X X X X | 1 1 1 |
| 0 | 0 1 X X X X X | 1 1 0 |
| 0 | 0 0 1 X X X X | 1 0 1 |
| 0 | 0 0 0 1 X X X | 1 0 0 |
| 0 | 0 0 0 0 1 X X | 0 1 1 |
| 0 | 0 0 0 0 0 1 X | 0 1 0 |
| 0 | 0 0 0 0 0 0 1 | 0 0 1 |
| 1 | X X X X X X X | 0 0 0 |

IMAGE SIGNAL COMPRESSION ENCODING APPARATUS AND IMAGE SIGNAL EXPANSION REPRODUCING APPARATUS

BACKGROUND OF THE INVENTION

1. Field of the Invention

The present invention relates to an image signal compression encoding apparatus and to an image signal expansion reproducing apparatus, and in particular, to an image signal compression encoding apparatus in which after a two-dimensional orthogonal transformation of a video signal, the video signal can be normalized by use of a desired normalization coefficient and to an image signal expansion reproducing apparatus for decoding data thus encoded.

2. Description of the related Art

When loading a memory with digital image data such as image data shot by an electronic still camera, in order to reduce the amount of data to minimize the storage capacity of the memory, various kinds of compression and encoding operations are performed on the image data. Particularly, two-dimensional orthogonal encoding has been commonly employed because the encoding can be accomplished with a high compression rate and image distortion in the encoding can be suppressed.

In such a two-dimensional orthogonal transformation of a video signal, the image data is subdivided into a predetermined number of blocks. The transformation is conducted on image data of each block. Obtained image data, namely, a transformation coefficients are compared with a predetermined threshold value and the that portion does not exceed the threshold value is truncated (i.e. a coefficient truncation is achieved.) As a result, thereafter, any translation coefficients not exceeding the threshold are treated as data of zero in the processing. The transformation coefficients, which have undergone the truncation, are then divided by using a predetermined quantization step value, namely, a normalization coefficient to be quantized or normalized depending on the step width. Through the operation above, the value of the translation coefficients, namely, the dynamic range of the amplitude can be suppressed.

The normalized translation coefficients are thereafter encoded. By the way, the transformation coefficients include data items arranged from a low-frequency range to a high-frequency range depending on the magnitude of each block of the image data. Since the data of the normalized transformation coefficients become 0 in the high-frequency component, run-length encoding is achieved in which the original data are translated into a continuation length of value 0, namely, a so-called run length of 0 and a value of data including values of other than 0, namely, a so-called amplitude of non-zero. The resultant data is then subjected to a two-dimensional Huffman encoding to produce compressed image data thus encoded.

In the two-dimensional orthogonal transformation coding, by altering the value of the normalization coefficient, the image data can be encoded with various compression rates. For example, with a large value of the normalization coefficient, the normalized translation coefficient data takes a small value. Consequently, the compression rate of the image data is increased and the picture quality of the attained data is lowered. Conversely, for a small value of the normalization coefficient, the image data is compressed with a small compression rate and hence a high picture quality is developed for the attained data.

As a consequence, although the normalization is to be achieved with various kinds of normalization coefficients, normalization coefficient data used in an inverse normalization to be conducted by a reproducing apparatus is required to be changed. This leads to a problem that the normalization coefficients cannot be arbitrarily selected. In particular, after the orthogonal translation, when the compression rate of the encoding is desired to be varied between the low-frequency and high-frequency components, there arises a problem of a difficulty in setting the normalization coefficient to the different values.

SUMMARY OF THE INVENTION

It is therefore an object of the present invention to provide an image signal compression encoding apparatus wherein normalization of a transformation coefficients after an orthogonal transformation is performed, and the normalization can be achieved by setting various normalization data items which provides an image signal expansion reproducing apparatus capable of appropriately decoding the data produced through the compression encoding, thereby solving the problems of the conventional technology.

In accordance with the present invention, an image signal compression encoding apparatus in which digital image data constituting a screen image is subdivided into a plurality of blocks to achieve a two-dimensional orthogonal transformation encoding on image data of each block includes orthogonal transformation means for conducting a two-dimensional orthogonal transformation of digital image data thus subdivided into plural blocks, normalizing means for normalizing the data transformed by the orthogonal transformation means, table data store means for storing therein table data employed by the normalizing means for the normalization, encode means for encoding the data normalized by the normalizing means, and output data generating means for generating output data comprising the data encoded by the encode means. The output data generating means produces, in addition to the data encoded by the encode means, the table data used by the normalizing means to achieve the normalization.

Furthermore, in accordance with the present invention, an image signal expansion reproducing apparatus for receiving digital image data of a screen which has undergone the compression encoding to achieve a two-dimensional inverse transformation encoding on the data including input means for inputting therefrom data comprising image data, decode means for decoding image data supplied from the input means, inverse normalizing means for inversely normalizing the data decoded by the decode means, table data supply means for selecting table data to be employed by the inverse normalizing means for the inverse normalization so as to supply the data to the inverse normalizing means, and orthogonal inverse transformation means for achieving a two-dimensional orthogonal inverse transformation on the data thus inversely normalized by the inverse normalizing means, the inverse normalizing means achieving the inverse normalization based on table data included in data supplied thereto.

BRIEF DESCRIPTION OF THE DRAWINGS

The objects and features of the present invention will become more apparent from the consideration of the following detailed description taken in conjunction with the accompanying drawings in which:

FIG. 6 is a schematic diagram illustrating a fixed-length item generating buffer 30;

FIG. 12 is a diagram illustrating relationships between amplitude values of the translation coefficient, amplitude ranges thereof, and additional bits; and FIG. 13 is a schematic diagram illustrating relationships between amplitude values of the transformation coefficient and amplitude ranges thereof.

DESCRIPTION OF THE PREFERRED EMBODIMENTS

Figure 1:
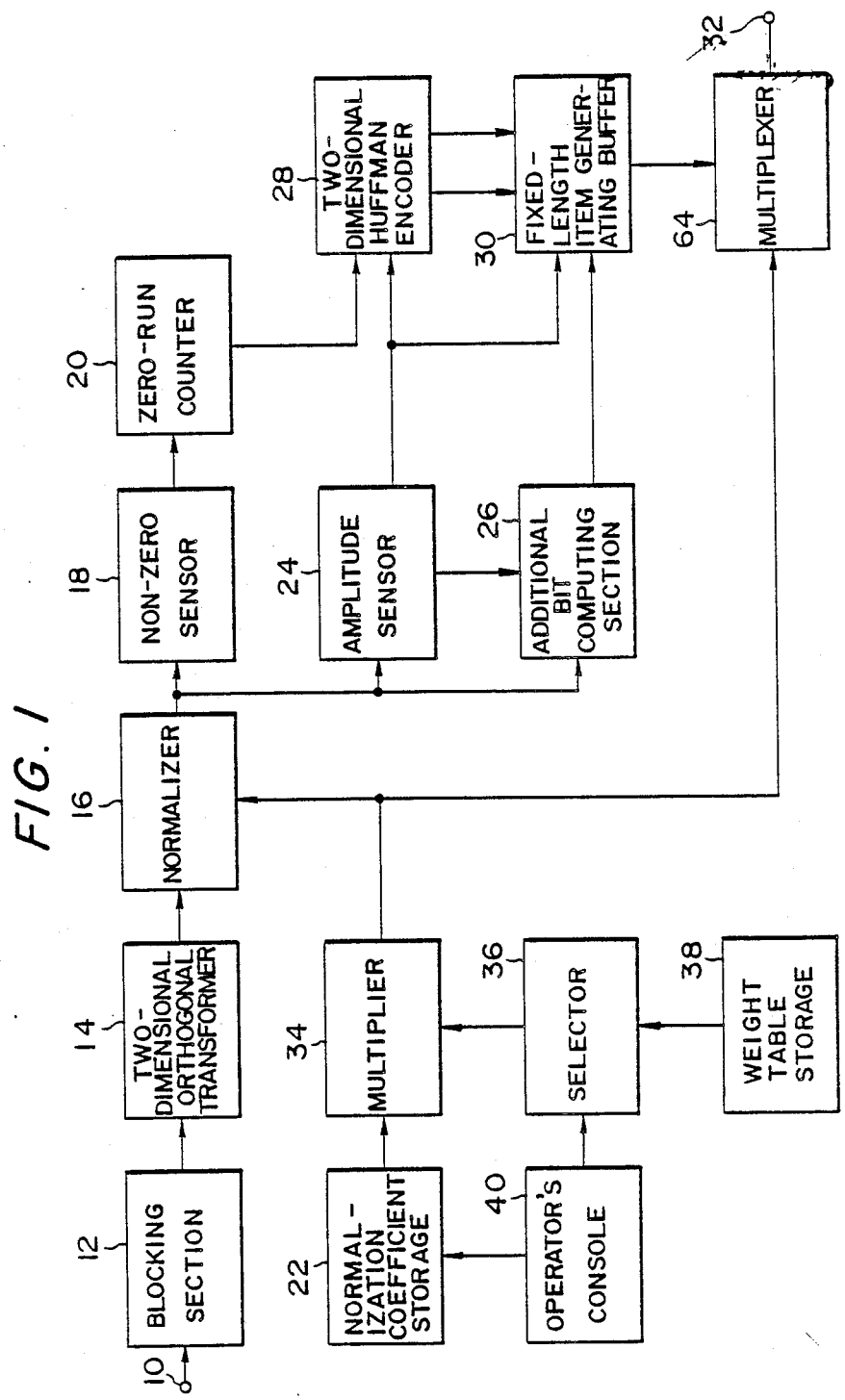
FIG. 1 is a schematic block diagram illustrating an embodiment of an image signal compression encoding apparatus in accordance with the present invention.

Referring now to the drawings, a description will be given in detail of an image signal compression encoding apparatus and an image signal expansion reproducing apparatus in accordance with the present invention.

FIG. 1 illustrates an embodiment of an image signal compression encoding apparatus in accordance with the present invention.

The system includes a blocking section 12, which includes a frame buffer to be loaded with a frame of still video data shot by an electronic still camera and supplied thereto via an input terminal 10. The image data of a frame stored in the blocking section 12 is subdivided into a plurality of blocks. The content of each block is read out therefrom so as to be fed to a two-dimensional orthogonal transformer 14. The transformer section 14 achieves a two-dimensional orthogonal transformation on the image data of each block. The translation may be any one of known two-dimensional orthogonal transformations such as a discrete cosine transformation and Hadamard transform coding.

Figure 8:
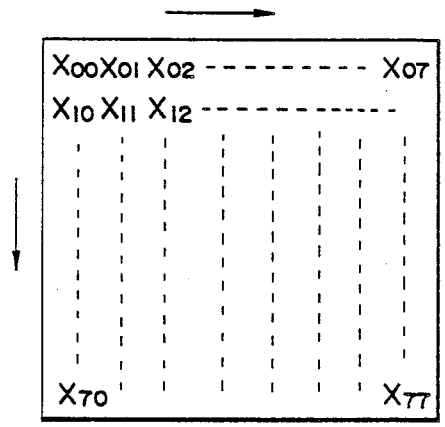
FIG. 8 is a diagram illustrating data obtained through a two-dimensional orthogonal transformation.

The image data of each block which has undergone the two-dimensional orthogonal translation in the translator 14 is arranged in a two-dimensional array as illustrated in FIG. 8 such that lower-order data is located in the upper-left portion and higher-order data is placed in the lower-right portion as indicated by arrows. The two-dimensional orthogonal transformer 14 produces an output to be fed to a normalizer 16.

The normalizer 16 conducts a coefficient truncation on the image data which has undergone the two-dimensional orthogonal transformation in the transformer 14, namely, on translation coefficients so as to normalize the data thereafter. In the coefficient truncation, the transformation coefficients which have undergone the orthogonal transformation are compared with a predetermined threshold value to truncate a portion of data not exceeding the threshold value. In the normalization, the translation coefficients after the coefficient truncation are divided by a predetermined quantization step value, thereby achieving a quantization of the image data.

Connected to the normalizer 16 is a multiplier 34 for inputting the quantization step value to the normalizer 16. The multiplier 34 is linked to a normalization coefficient storage 22 and a selector 36, which is in turn connected to a weight table storage 38. The normalization coefficient storage 22 and the selector 36 are connected to an operator's console 40 for supplying therefrom the system with an instruction from the operator.

Figure 10:
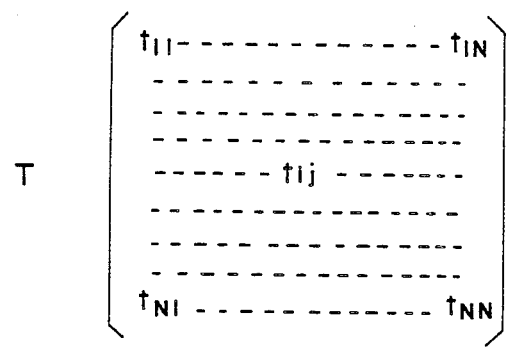
FIG. 10 is a diagram illustrating an example of weight table data.

The weight table storage 38 is loaded with data of various kinds of weight tables Ts, as illustrates in FIG. 10, to be employed for the normalization in the normalizer 16. The table data items are delivered to the selector 36. Depending on an instruction of the operator supplied from the operator's console 40, a weight table T is selected by the selector 36 so as to be fed to the multiplier 34. On the other hand, according to an instruction of the operator supplied from the operator's console 40, a normalization coefficient stored in the normalization coefficient storage 22 is selectively obtained therefrom so as to be sent to the multiplier 34. The weight table content is multiplied by the data of the normalization coefficient in the multiplier 34, which thus attains a quantization step value to be adopted in the normalization.

The data of the quantization step value in the multiplier 34 are supplied to the normalizer 16, which divides by the obtained value the transformation coefficient supplied from the two-dimensional transformer 14 has undergone the coefficient truncation, thereby accomplishing the normalization. The multiplier 34 delivers an output of the quantization step value, in addition to the normalizer 16, to a multiplexer 64.

In the translation coefficient, since the low-frequency component is more effective as data when compared with the high-frequency component, the weight table T as illustrated in FIG. 10 is loaded with, for example, smaller values in the low-frequency portion and larger values in the high-frequency portion. The normalization of the data is accomplished by dividing transformation coefficients which have undergone the coefficient truncation by a value $\alpha T$ attained by multiplying the data of the table T by the normalization coefficient $\alpha$. Assuming the translation coefficients prior to the normalization to be X, the coefficient X' after the normalization is represented as follows.

$$X' = X/(\alpha T)$$

For example, the table data T is multiplied by $\alpha$ in which the low-frequency and high-frequency components of the transformation coefficient X are respectively associated with the low-frequency and high-frequency components of the table T. The translation coefficients X are divided by the resultant value.

As described above, with the provision of the weight table T, in place of a uniform division of the translation coefficient X by a value $\alpha$, a smaller value can be adopted as a divider for the division associated with the low-frequency portion to minimize the compression rate, whereas a larger value can be used for the division associated with the low-frequency portion to increase the compression rate. Furthermore, when compressing data in a high picture quality mode, owing to the small value of the normalization coefficient $\alpha$, by setting a larger value to the low-frequency component and a smaller value to the high-frequency component of the weight table T, an occurrence of an overflow which will concentrate on the low-frequency component can be reduced.

Figure 11:
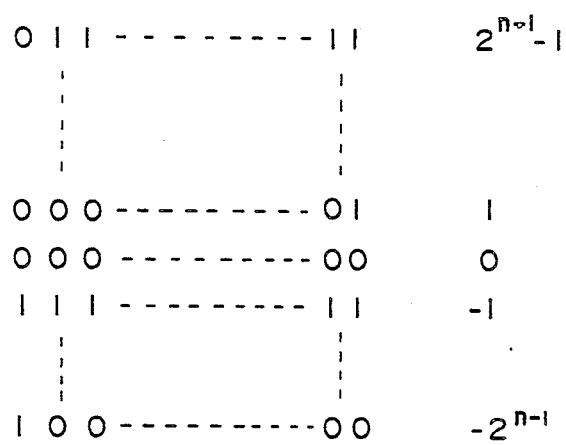
FIG. 11 is a schematic diagram illustrating an example of a normalized transformation coefficient.

The output from normalizer 16 is an n-bit transformation coefficient normalized as illustrates in FIG. 11. The coefficient represented with n-bit data takes, as can be seen from this figure, a value ranging from $2^{n-1}$ to $-2^{n-1}$. That is, in this example, a half portion including n−1 bits represents a value of 0 or a value in a range from $2^{n-1}$ to 1 and another half portion including n−1 bits denoting a negative value ranging from −1 to $-2^{n-1}$. Of those values, the negative data items from −1 to $-(2^{n-1}-1)$ are 2's complements associated with the positive data items ranging from 1 to $2^{n-1}-1$, respectively.

Figure 9:
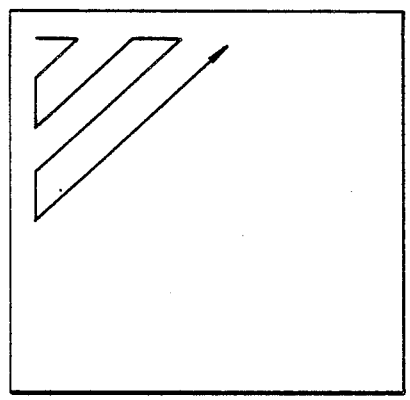
FIG. 9 is a schematic diagram illustrating encoding operations associated with the run length and a non-zero amplitude.

For the normalized transformation coefficient, the n-bit data items are arranged in a two-dimensional array in a similar fashion as employed for the data items prior to the normalization as illustrated in FIG. 8. These data items are sequentially produced through a zigzag scanning as illustrated in FIG. 9.

The normalizer 16 delivers the output to a non-zero sensor 18, an amplitude sensor 24, and an additional-bit computing section 26.

Figure 2:
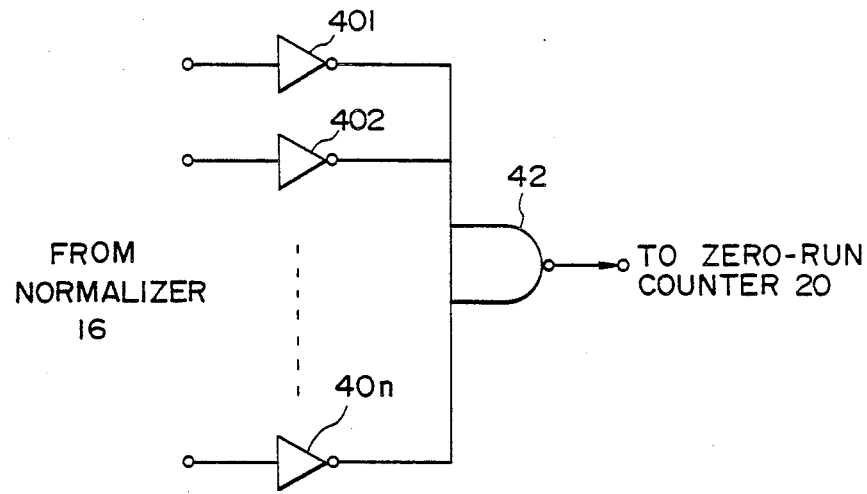
FIG. 2 is a block diagram illustrating a non-zero sensor section 18 of FIG. 1.

The non-zero sensor 18 is supplied with transformation coefficient data including n bits as illustrates in FIG. 2 to be received by inverters 401, 402, ... and 40n thereof. These inverters deliver the respective outputs to a NAND circuit 42. Each bit of the n-bit transformation coefficient data is supplied to the associated one of the inverters 401, 402, ... and 40n as data of "1" or "0". For a data item "1", the inverter produces "0". As a consequence regardless of the outputs from the other inverters, the NAND circuit 42 generates an output "1". This value "1" denotes a non-zero transformation coefficient data, namely, that the n-bit coefficient is other than 0. Conversely, when all bits of the translation coefficient data are "0", each inverter produces an output "1". Consequently, the NAND circuit generates an output "0". This value "0" designates a zero transformation coefficient, namely, that the n-bit coefficient is 0. The non-zero sensor 18 delivers the output to a zero-run counter 20.

Figure 3:
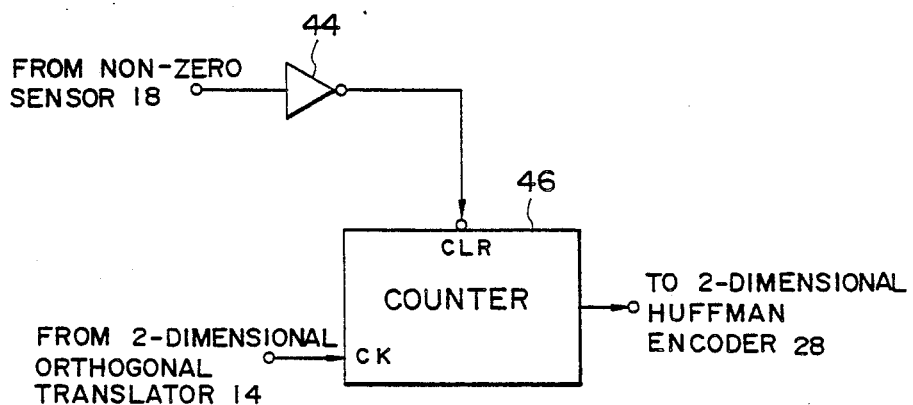
FIG. 3 is a schematic block diagram illustrating a zero-run counter 20 of FIG. 1.

The zero-run counter 20 of this embodiment includes an inverter 44 and a six-bit counter 46 as illustrates in FIG. 3. The inverter 44 is supplied with the output from the non-zero sensor 18, namely, a zero or non-zero signal so as to produce an inverted signal thereof. The output from the inverter 44 is inverted so as to be fed to a clear terminal CLR of the counter 46. On receiving a non-zero signal "1" from the non-zero sensor 18, a signal "0" is supplied to the clear terminal CLR to clear the counter 46. The counter 46 is supplied with a translation coefficient transfer check clock via a clock input terminal CK from the two-dimensional orthogonal transformer 14 so as to count the clocks. When a signal "0" is received by the clear terminal CLR, the count value is cleared. As a consequence, the counter 46 continues the counting while the zero signal "0" being received from the non-zero sensor 18. In response thereto, the length of a zero run is counted in the zigzag scan of FIG. 9.

In this embodiment, the block size is $8 \times 8 = 64$ and the maximum number of continuous zero bits is limited to 64. As a consequence, the zero-run length can be represented with data including six bits. The zero-run counter 20 delivers the output to a two-dimensional Huffman encoder 28.

Figure 4A:
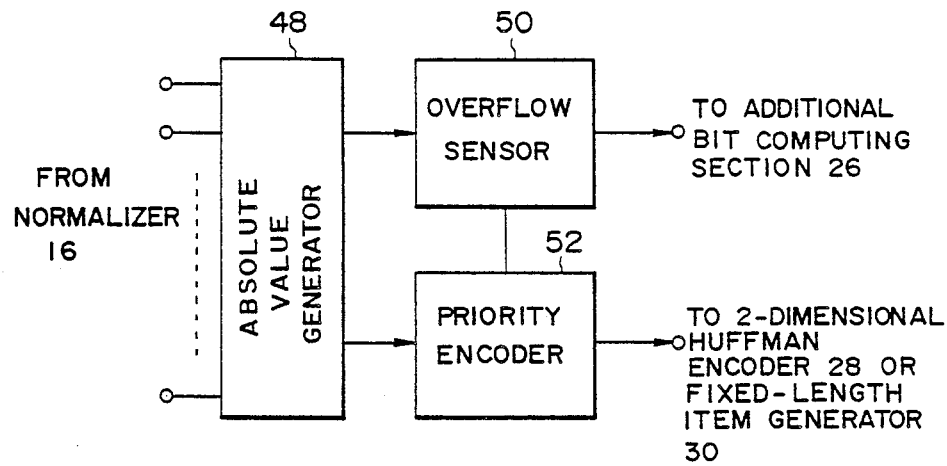
FIG. 4A is a block diagram illustrating an amplitude sensor section 24 of FIG. 1.

The amplitude sensor 24 is supplied with a translation coefficient from the normalizer 16 so as to produce an amplitude range bit and an overflow signal, which will be described later. As illustrated in FIG. 4A, the amplitude sensor 24 includes an absolute value generating circuit 48. The absolute value generator circuit 48 receives the normalized transformation coefficient including n bits from the normalizer 16 so as to create an absolute value thereof. That is, in a case where the inputted n-bit data is zero or a positive value in a range from $2^{n-1}$ to 1 of FIG. 11, the received data is directly outputted from the circuit 48. Whereas for a negative value in a range from −1 to $-2^{n-1}$, a 2' complement is generated so as to invert the sign symbol and producing an absolute value of the input data.

Figure 4B:
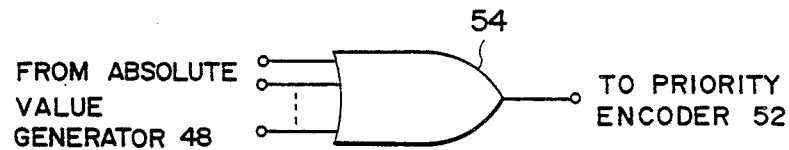
FIG. 4B is a schematic diagram illustrating an overflow sensor circuit 50 of FIG. 4A.

Of the n bits produced from the absolute value generating circuit 48, n−8 high-order bits are sent to an overflow sensor circuit 50. The sensor 50 includes, as illustrates in FIG. 4B, an OR circuit 54 receiving n−8 inputs. When either one of the n−8 inputs is "1", the circuit 54 produces an overflow signal "1". In this embodiment, as illustrates in FIG. 12, 8-bit data taking a value ranging from −127 to 127 associated with a level of the translation coefficient is compressed and encoded so as to transmit the resultant data. The data beyond the range from −127 to 127 is related to an overflow and hence additional data is added to the resultant data for the transmission. As a consequence, a portion exceeding eight bits, namely, the n−8 high-order bits include "1", an overflow is assumed and hence the overflow sensor 50 produces an overflow signal "1" in this case. The output from the circuit 50 is supplied to a priority encoder 52 and the additional bit computing section 26 of FIG. 1.

The priority encoder 52 is supplied with seven low-order bits of the n bits produced from the absolute value generating circuit 48. Since the transformation coefficient is data representing an absolute value created by the circuit 48, the data is in a range from −127 to 127 and hence can be represented with seven bits of the original eight bits where a bit is removed for use as a sign identification. In this situation, seven low-order bits of n bits from the circuit 48 are adopted to represent data in the range. As illustrated in FIG. 13, the priority encoder 52 is responsive to an output OF from the overflow sensor 50 and to the seven low-order bits from the absolute value generating circuit 48 so as to produce three-bit data indicating an amplitude range.

In a case, as illustrated in FIG. 13, where the overflow sensor 50 produces a signal "0", the transformation coefficient is expressed with seven low-order bits. Namely, depending on the seven low-order bits, the three-bit data is generated to indicate the amplitude range. Data of the amplitude range is set as illustrated in FIG. 12 according to the range of the data of seven low-order bits included in the translation coefficient. In FIG. 13, positions denoted by x in the seven low-order bits may take either one of the values "1" and "0".

For an overflow signal "1", there exists data exceeding eight low-order bits and hence "000" is produced for the amplitude range, namely, a signal indicating an overflow is generated as shown in FIG. 13.

In this embodiment, a three-bit amplitude range is developed in association with a range of the amplitude value as illustrated in FIG. 12. For example, for an amplitude value −1 or 1, the amplitude range is determined as "001". In a case where the amplitude is in a range from −127 to −64 or from 64 to 127, the amplitude range is attained as "111". Incidentally, the additional bit of FIG. 13 designates the number of bits necessary for identifying a value of data for which the amplitude range, namely, the range of the amplitude value is specified by the three-bit amplitude range data.

For example, for the amplitude range data "010" of FIG. 12, available amplitude values include −3, −2, 2, and 3. In this situation, two bits are required to specify either one of these four data items. Consequently, three-bit data is necessary to represent data ranging from −3 to 3. However, since the amplitude range data specifies the amplitude range, only two bits are required for the additional-bit data to identify the data in the range. As described above, when $n+1$ bits are necessary to denote the amplitude data itself, if the amplitude range is specified by the amplitude range data, the additional-bit data needs to only include n bits.

The amplitude range data produced from the priority encoder 52 is fed to the two-dimensional Huffman encoder 28 and a fixed-length item generating buffer 30.

The two-dimensional Huffman encoder 28 receives data of a zero-run length from the zero-run counter 20 and data of an amplitude range from the amplitude sensor 24 to achieve a two-dimensional Huffman encoding thereon. In this embodiment, the zero-run length and the amplitude range are respectively expressed with six and three bits, namely, nine-bit data including a combination of these data items is subjected to the Huffman encoding. The two-dimensional Huffman encoder 28 supplied the fixed-length item generating buffer 30 with data of a predetermined number of bits (m bits) thus encoded and a length of the encoded data or a so-called Huffman code length.

Figure 5:
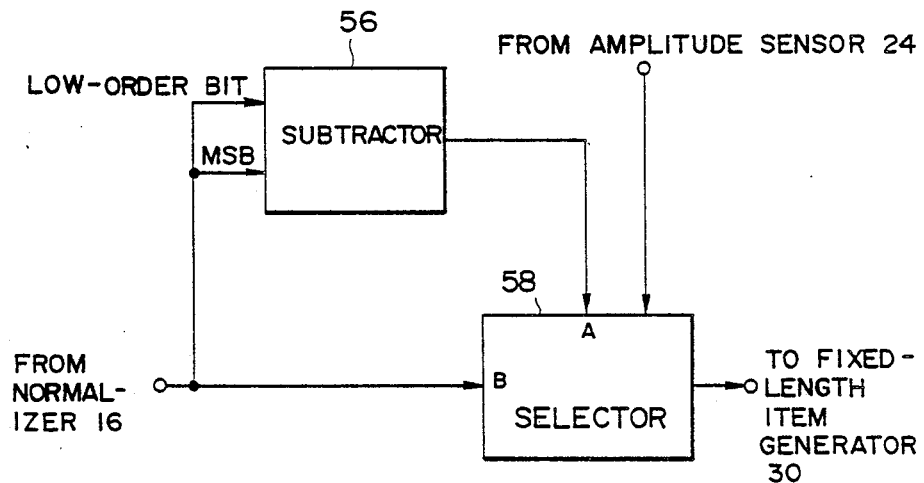
FIG. 5 is a diagram schematically illustrating an additional-bit computing section 26 of FIG. 1.

The additional-bit computing section 26 is includes a subtractor 56 and a selector 58 as illustrated in FIG. 5. This section 26 receives a normalized transformation coefficient from the normalizer 16 and an overflow signal from the amplitude sensor 24. The subtractor 56 is supplied with data of seven low-order bits of the translation coefficient and the most-significant bit, MSB, as the highest-order bit. The data of MSB signal is subtracted from the data of seven low-order bits. The MSB signal is "0" or "1" when the data of the seven low-order bits is positive or negative, respectively. The subtractor 56 sends a subtraction result represented with data including at most seven bits to an input A of the selector 58.

The selector 58 has another input B, which directly receives the n-bit transformation coefficient from the normalizer 16. Furthermore, the selector 58 receives an overflow signal from the amplitude sensor 24. For an overflow signal "0" indicating the absence of an overflow, the selector 58 selects data including at most seven bits received from the input A. For an overflow signal "1" denoting the presence of an overflow, the selector 58 selects the n-bit translation coefficient data attained from the input B. As a consequence, the data outputted from the additional-bit computing section 26 includes at most seven bits or the n-bit data depending on the absence or presence of an overflow, respectively.

The fixed-length item generating buffer 30 includes, as illustrated in FIG. 6, a bit length computing section 60 and a buffer 62. The bit length computing section 60 is supplied with the amplitude range data from the amplitude sensor 24 and the Huffman code length from the two-dimensional encoder 28. Based on the amplitude range and the Huffman code length, the computing section 60 determines the total number of bits included in data obtained through the Huffman encoding and additional-bit data to be added thereto so as to supply the buffer 62 with an address signal for a write operation of the data associated with the number of bits. Since the additional-bit data includes at most seven bits when an overflow does not occur and n bits at an occurrence of the overflow, a signal including the additional-bit data and the bits of data obtained through the Huffman encoding is delivered to the buffer 62.

The buffer 62 further receives additional bits ranging from one bit to n bits from the additional-bit computing section 26 and the Huffman-encoded data from the two-dimensional Huffman encoder 28. Depending on the total data length of the encoded data and the additional-bit data, the bit length computing section 60 produces an address signal. These data items are written in the buffer 62 at an address designated by the address signal.

The data stored in the buffer 62 is transmitted to the multiplexer 64 of FIG. 1 after the Huffman-encoded data is combined with the additional-bit data so as to be sent thereto in the unit of data including a predetermined number of bits. The multiplexer sequentially selects the encoded data sent from the fixed-length item generating buffer 30 or the quantization step value supplied from the multiplier 34. The selected data or value is sent from an output terminal 32 to a transmission route or is written on a recording medium such as a magnetic disk.

According to a compression encoder as described above, the input image data is subdivided into a plurality of blocks by the blocking section 12 for undergoing the two-dimensional orthogonal translation by the two-dimensional orthogonal transformer 14. The transformation coefficient attained through the orthogonal translation is subjected to the coefficient truncation and the normalization as described above. The resultant data is sent to the non-zero sensor 18 and the amplitude sensor 24 sense the non-zero and the amplitude, respectively. Thereafter, the zero-run length attained by the zero-run counter 20 and the amplitude range data from the amplitude sensor 24 are subjected to the two-dimensional Huffman encoding in the two-dimensional Huffman encoder 28.

The encoded data is checked in the fixed-length item generating buffer 30 to determine whether or not an overflow occurs in consideration of the amplitude range data. If an overflow does not occur, the additional bit data ranging from one bit to seven bits is produced for the encoded data. Otherwise, the additional bit data including n bits is added to the encoded data.

Consequently, when the overflow does not occur, the which data has undergone the two-dimensional Huffman encoding and the additional-bit data including the fewer number of bits is transmitted or recorded so as to achieve the compression encoding of image data. On the other hand, at an occurrence of an overflow, the produced data includes the encoded data and the additional-bit data. As a consequence, the additional bit represents the image data itself. As a result, in a reproduction of the image data, the picture quality is prevented from being deteriorated due to the overflow.

In the conventional compression encoder, when the amplitude of the normalized translation coefficient is beyond the predetermined range, namely, when the number of bits of the transformation coefficient exceeds the number of the present bits, a data overflow takes place. For example, in the n-bit data as illustrated in FIG. 11, if the amplitude range is specified as n−1 bits, when the n-bit data takes a negative value, the data "1" of the upper-most bit is ignored so as to set the amplitude range based on the other n−1 bits. Since the produced data includes the additional bit which data has and the data undergone the Huffman encoding based on the amplitude range and the zero-run length, when decoding the data, it is impossible to decode the data "1" of the upper-most bit. Namely, the same decoding result is attained from the data items respectively having "1" and "0" at the upper-most position. As a result, an image displayed with the decoded image data is attended with an inversion in white and black portions and hence the picture quality is deteriorated.

Particularly, in order to reduce the compression rate, when the value of the normalization coefficient employed by the normalizer 16 for the normalization is reduced, the normalized transformation coefficients takes a large value. As a consequence, an overflow is likely to occur and hence the picture quality is lowered. Namely, this leads to a disadvantage that even if the compression rate is minimized to attain a high picture quality, it is impossible to develop the desired picture quality.

In contrast thereto, according to the apparatus of the embodiment, when an overflow occurs based on the preset amplitude range, the system produces output data by adding the additional-bit data representing the image data to the encoded data which has undergone the compression coding. As a consequence, the value of the image data is denoted by the additional-bit data. By decoding the additional-bit data, the original image data can be reproduced and hence no deterioration of the picture quality due to the overflow occurs.

Furthermore, the amplitude range data specifies the amplitude range, namely, a range of the amplitude value. The range data is Huffman-encoded together with the zero-run length. Consequently, when data causes an overflow as described above, since the data represents a value obtained by removing the value in the range specified by the amplitude range data, the value of additional bits to identify the data can be expressed with bits of which the number is less by one than the number required to represent the data itself.

For example, as illustrated in FIG. 12, when the amplitude value data is in a range from −255 to −128 and in a range from 128 to 255, the amplitude value data can be identified by additional-bit data including eight bits. In a case where the amplitude value data is in a range from −255 to 255, although nine-bit data is naturally necessary to express this data, since the data in the range from −127 to 127 is beforehand removed, the data can be identified by eight bits.

In addition, with the provision of the weight table T, in place of the operation to uniformly divide the translation coefficient by a value $a$, various values can be used for the normalization depending on the components of the translation coefficient. For example, for the division, smaller and larger values may be employed for the low-frequency and high-frequency components, respectively. In this case, for the compression encoding operation, a smaller compression rate can be applied to the low-frequency components which are more effective as data, whereas a larger compression rate can be used for the high-frequency components which are less effective as data. As a result, the compression rate as well as the picture quality can be increased. Conversely, when a large compression rate is adopted for the low-frequency component in the compression encoding, the overflow can be prevented.

The weight table T may be loaded with arbitrary predetermined data. Moreover, data inputted from the operator's console 40 to specify a weight table T and data supplied from the console 40 to specify a normalization coefficient or the table data itself may be delivered to the multiplexer 64 such that an encoding is achieved by use of these data items in a decoder, which will be described later.

Figure 7:
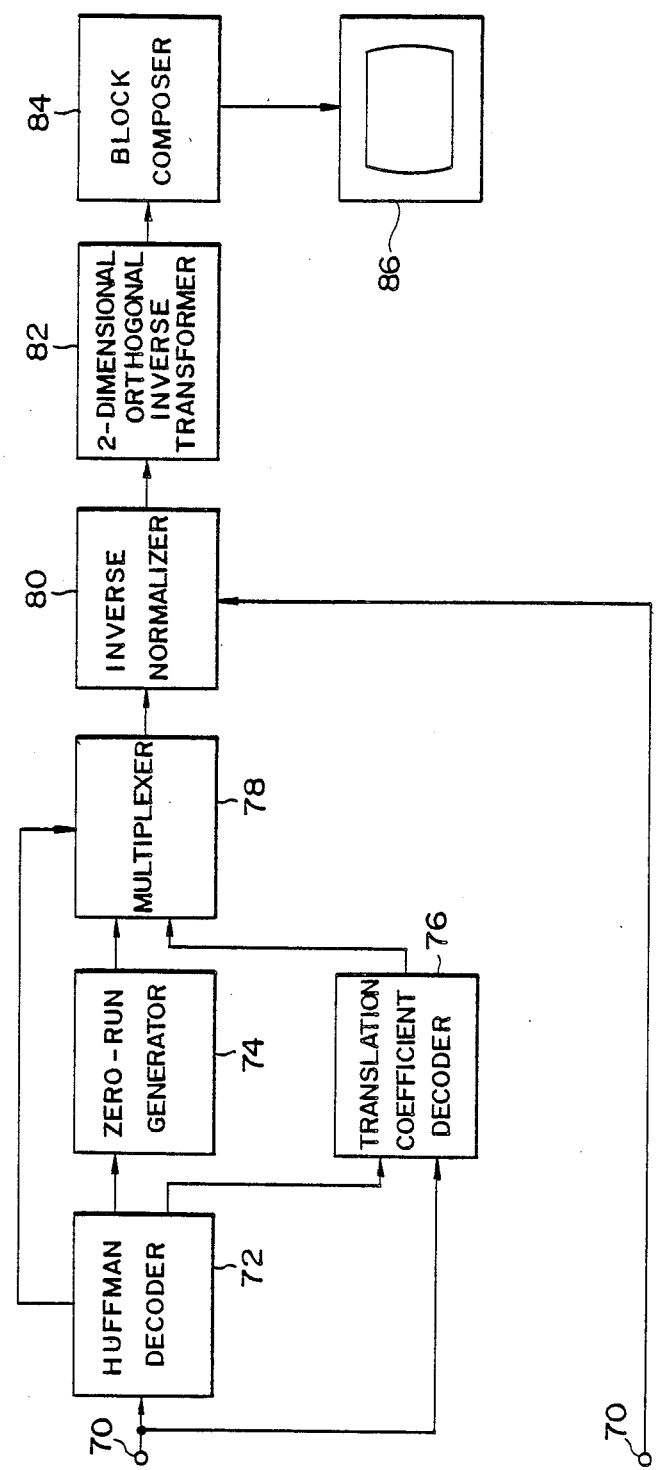
FIG. 7 is a block diagram schematically illustrating an image signal expansion reproducing apparatus for decoding and for reproducing image data compressed and encoded by the compression encoding apparatus of FIG. 1.

FIG. 7 illustrates an embodiment of an image signal expansion reproducing apparatus in accordance with the present invention. This apparatus is employed to achieve an expansion playback operation of image data encoded by the encoder of FIG. 1.

The configuration of FIG. 7 includes a Huffman decoder 72, which has an input terminal 70 to receive image data generated through the compression encoding in the compression encoder of FIG. 1. Namely, the input terminal 70 receives data obtained through the Huffman encoding achieved by the two-dimensional Huffman encoder 28 of the system illustrated in FIG. 1 and the additional-bit data generated by the additional-bit computing section 26 of the system. Of these data items, the Huffman-encoded data is fed to the Huffman decoder 72. The Huffman decoder 72 decodes the received data based on data transmitted from a Huffman table, not shown, so as to obtain data of the zero-run length and data of the non-zero amplitude range. The zero-run data and the non-zero amplitude range data created from the Huffman decoder 72 are delivered to a zero-run generator 74 and a transformation coefficient decoder 76, respectively. Moreover, the Huffman decoder 72 outputs a zero/non-zero switch signal to a multiplexer 78.

On the other hand, the additional-bit data from the input terminal 70 is supplied to the transformation coefficient decoder 76.

The zero-run generator 74 produces, based on the zero-run length data from the Huffman decoder 72, data of zeros of which the number is associated with the run length. That is, the number of zeros is equivalent to the run length. The zero-run data created from the zero-run generator 74 is transmitted to the multiplexer 78.

The transformation coefficient decoder 76 decodes an n-bit non-zero translation coefficient based on the non-zero amplitude range data from the Huffman decoder 72 and the additional-bit data from the input terminal 70. If the amplitude range data is other than "000", it is indicated that the overflow sensor 50 of the apparatus of FIG. 1 has not sensed an overflow. Consequently, the translation coefficient decoder 76 accomplishes the decoding by use of the three-bit amplitude range data and the additional-bit data to compute the non-zero translation coefficient. If the amplitude range data is "000", the overflow sensor 50 of the apparatus of FIG. 1 is assumed to have sensed an overflow. Consequently, the transformation coefficient decoder 76 achieves the decoding by use of the additional-bit data to attain the non-zero transformation coefficient. In a case of an occurrence of an overflow, since the non-zero transformation coefficient itself has been transmitted as the additional-bit data, this data is directly adopted as an output from the decoded transformation coefficient. The transformation coefficient decoder 76 delivers the output to the multiplexer 78.

The multiplexer 78 selects, depending on the zero-/non-zero switch signal from the Huffman decoder 72, the zero-run data from the zero-run generator 74 or the n-bit non-zero transformation coefficient from the transformation coefficient decoder 76. When the zero/non-zero switch signal indicates zero, the zero-run data from the zero-run generator 74 is selected. Whereas, when the non-zero is indicated, the n-bit non-zero transformation coefficient from the transformation coefficient decoder 76 is used. The multiplexer 78 delivers the output to an inverse normalizer 80.

The inverse normalizer 80 is supplied with, in additional to image data from the input terminal 70, data of a product $\alpha T$ between the normalization coefficient and table data. Based on the data $\alpha T$, the inverse normalizer 80 inversely normalizes the decoded data from the multiplexer 78. That is, the data $\alpha T$ is multiplied by the decoded image data from the multiplexer 78 so as to achieve the inverse normalization. The decoded image data from the multiplexer 78 includes encoded data obtained through a normalization by use of the weight table T as illustrated in FIG. 10. As a consequence, data as a result of a multiplication between the normalization coefficient $\alpha$ and the weight table data T is supplied to the input terminal to conduct the inverse normalization. By multiplying the data from the multiplexer 78 by the data $\alpha T$, the inverse normalization is accomplished.

The inverse normalizer 80 sends the output to a two-dimensional inverse transformer 82, which conducts a two-dimensional orthogonal inverse transformation on the inversely normalized data from the inverse normalizer 80. The two-dimensional inverse transformer 82 transmits the output to a block composer 84, which combines a plurality of blocks into image data of an overall screen. The block composer 84 delivers the output to a cathode-ray tube, CRT 86 to reproduce the image thereon. By the way, in lace of the CRT 86, there may be disposed, for example, a printer to which the output is supplied so as to produce a print.

In accordance with the image signal reproducing apparatus above, the image data which has undergone the compression encoding in the encoder of FIG. 1 can be reproduced through the expansion.

In accordance with this apparatus, since the inverse normalizer 80 achieves the inverse normalization based on the image data from the input terminal 70 and the data of the product between the normalization coefficient $\alpha$ and the weight table T, the decoding can be carried out in association with the normalization coefficient and the weight table employed in the encoding. As a consequence, encoded data items obtained through various encoding operations depending on image data items can be appropriately decoded, for thereby reproducing the image data.

As described above, when data encoded by use of a weight table is to be decoded, it is possible in the decoding operation, for example, to adopt a small value and a large value as the divider in the normalization of the low-frequency and high-frequency components, respectively. As a consequence, since the decoding is achieved on encoded data through an encoding such that a smaller compression rate is applied to the low-frequency component which is more significant as data and that a larger compression rate is used for the high frequency component which is less effective as data, the reproduced image develops a high picture quality. Furthermore, the low-frequency component is encoded with a large compression rate so as to prevent an occurrence of the overflow. The obtained data is decoded to reproduce an image with a high picture quality.

According to the image signal reproducing apparatus above, since the decoding can be achieved depending on the received weight table data, and also in a case where various weight tables are used in the image data encoding, the respective image data can be appropriately decoded.

Furthermore, in this reproducing apparatus, as described above, the encoded data from the input terminal 70 is decoded by the Huffman decoder 72 to obtain the zero-run length and the non-zero amplitude range. Thereafter, the zero-run generator 74 and the transformation coefficient decoder 76 produce data of zeros of which the number is associated with the run length and the non-zero translation coefficient data. When the amplitude range is within a predetermined range, the transformation coefficient decoder 76 decodes the transformation coefficient by use of the amplitude range data and the additional-bit data. When the amplitude range is beyond the predetermined range, the transformation coefficient is produced by use of the additional-bit data including n bits. As a consequence, also in a case where the amplitude range is beyond the predetermined range, the translation coefficient can be generated from the additional-bit data. With this provision, it is possible to prevent the occurrence of missing data taking place due to a data overflow in the conventional system in which the decoding is conducted only by use of the amplitude range data. As a result, the picture quality deterioration caused by the data overflow does not appear.

As above, in accordance with the reproducing apparatus, data of the zero-run length and data of the non-zero amplitude range, which each undergone the Huffman encoding, and the additional bit data at an occurrence of an overflow are decoded so as to reproduce an image. As a consequence, image data which has undergone the compression encoding based on an amplitude range can be decoded for the playback of the data. Moreover, also when an overflow occurs with respect to the amplitude range in the compression encoding, the image can be reproduced by use of the additional-bit data.

In accordance with the present invention, since the compression encoder employs table data in the normalization after the orthogonal transformation, various kinds of normalization can be achieved by setting associated table data. Consequently, the compression rate can be arbitrarily set. Furthermore, the overflow in the encoding of image data can be prevented.

In addition, since the table data adopted in the normalization is sent from the compression encoder to the reproducing apparatus, the table data can be used for the inverse normalization in the reproducing apparatus so as to decode image data depending on the data employed in the encoding operation.

While the present invention has been described with reference to the particular illustrative embodiment, it is not to be restricted by those embodiments but only by the appended claims. It is to be appreciated that those skilled in the art can change or modify the embodiment without departing from the scope and spirit of the present invention.

What is claimed is:

1. An image signal compression encoding apparatus in which digital image data for a screen is subdivided into a plurality of blocks so as to achieve a two-dimensional orthogonal transformation encoding on image data of each block comprising;
    orthogonal transforming means for conducting a two-dimensional orthogonal transformation of the digital image data thus subdivided into the plurality of blocks;
    normalizing means for normalizing the data transformed by said orthogonal means;
    table data store means for storing therein table data employed by said normalizing means for the normalization;
    encoder means for encoding the data normalized by said normalizing means; and
    output data generating means for generating output data including the data encoded by said encoder means,
    said output data generating means producing, in addition to the data encoded by said encoder means, the table data used by said normalizing means to achieve the normalization.

2. An apparatus in accordance with claim 1, wherein said normalizing means uses, in addition to the table data, a normalization coefficient so as to divide the data which has undergone the orthogonal transformation by data obtained from multiplying the normalization coefficient by the table data, thereby achieving the normalization.

3. An apparatus in accordance with claim 1 further comprising;
    overflow sense means for sensing a condition that an amplitude value of the normalized data is beyond a predetermined range,
    said output data generating means producing in the condition where the amplitude value of the normalized data is beyond the predetermined range and the condition is sensed by said overflow sense means, data identifying the normalized data in addition to data encoded by said encoder means.

4. An apparatus in accordance with claim 3, wherein;
    when said overflow sense means fails to sense the condition that the amplitude value of the normalized data is beyond the predetermined range, said output data generating means produces, in addition to the data encoded by said encoder means, additional-bit data including at most seven bits; and
    when said overflow sense means senses the condition that the amplitude value of the normalized data is beyond the predetermined range, said output data generating means produces, in addition to the data encoded by said encoder means, data identifying the normalized data, said identifying data including bits of which a number less than a number of bits of the normalized data by one.

5. An apparatus in accordance with claim 3, wherein;
    said overflow sense means includes an absolute value generating circuit for computing an absolute value of transformation coefficients supplied thereto and an OR circuit for receiving a predetermined number of high-order bits from said absolute value generating circuit such that the condition that the amplitude value of the normalized data being beyond the predetermined range is sensed by use of an output produced from said OR circuit.

6. An image signal exapnsion reproducing apparatus in which digital image data of a screen which has undergone the compression encoding is received so as to achieve a two-dimensional inverse transformation decoding on the received data comprising;
    input means for inputting therefrom data including image data;
    decode means for decoding image data supplied from said input means;
    inverse normalizing means for inversely normalizing the data decoded by said decode means;
    table data supply means for selecting table data to be employed by said inverse normalizing means for the inverse normalization so as to supply the data to said inverse normalizing means; and
    orthogonal inverse transformation means for achieving a two-dimensional orthogonal inverse transformation on the data thus inversely normalized by said inverse normalizing means,
    said inverse normalizing means achieving the inverse normalization based on table data included in data supplied thereto.

7. An apparatus in accordance with claim 6, wherein said inverse normalizing means uses, in addition to the table data, an inverse normalization coefficient for multiplying the data decoded by said decode means by data obtained by multiplying the inverse normalization coefficient by the table data, for thereby achieving the inverse normalization.

8. An apparatus in accordance with claim 6 further comprising;
    data select means for selecting at least one of the image data decoded by said decode means and the image data supplied from said input means; and
    overflow sense means for sensing a condition that an amplitude value of the input data is beyond a predetermined range based on the data decoded by said decode means,
    said data select means selecting, when said overflow sense means senses the condition that the amplitude value of the input data is beyond the predetermined range, the input image data in addition to the image data decoded by said decode means.

9. A method for achieving a two-dimensional orthogonal transformation encoding on digital image data for a screen subdivided into a plurality of blocks, comprising the steps of:
    (a) conducting a two-dimensional orthogonal transformation of the digital image data thus subdivided into the plurality of blocks;
    (b) normalizing the data transformed at said step (a);
    (c) storing table data employed at said step (b);
    (d) encoding the data normalized at said step (b); and
    (e) generating output data including the data encoded at said step (d) and the table data used at said step (b).

10. A method in accordance with claim 9, wherein said step (b) divides the data transformed at said step (a)

by multiplying a normalization coefficient with the table data for achieving the normalization.

11. A method in accordance with claim 9, further comprising the step of:
(f) sensing a condition that an amplitude value of the normalized data is beyond a predetermined range and generating data identifying the normalized data at said step (e) when the amplitude value of the normalized data is beyond the predetermined range.

12. A method in accordance with claim 11, wherein additional bit data including at most seven bits are produced at said step (e) when said step (f) fails to sense that the condition of the normalized data is beyond the predetermined range and data identifying the normalized data when said step (f) senses the condition of the amplitude value of the normalized data being beyond the predetermined range, said identifying data including bits of a number less than a number of bits of the normalized data by one.

13. A method in accordance with claim 11, wherein said step (f) computes an absolute value of transformation coefficients supplied thereto and receives a predetermined number of high-order bits such that the condition that the amplitude value of the normalized data being beyond the predetermined range is sensed.

* * * * *